INVENTOR
JESSE W. BEAMS

INVENTOR
JESSE W. BEAMS

United States Patent Office 3,041,482
Patented June 26, 1962

3,041,482
APPARATUS FOR ROTATING FREELY
SUSPENDED BODIES
Jesse W. Beams, Charlottesville, Va., assignor to the United States of America as represented by the Secretary of the Navy
Filed Feb. 19, 1953, Ser. No. 337,758
3 Claims. (Cl. 310—11)

This invention relates to means for imparting rotation to bodies that are freely suspended. More specifically, it relates to an apparatus for spinning rotors which are adapted to be freely suspended inside an evacuated chamber by a magnetic field.

In a prior related application, entitled Magnetically Supported Gyroscope, Serial No. 208,542, filed January 30, 1951, by Jesse W. Beams et al., now Patent No. 2,691,306, there are described means for freely suspending a mass of magnetic material in a medium at either atmospheric pressure or reduced pressure and means for imparting rotation to a mass so suspended. A mass suspended in a vacuum chamber by a controlled magnetic field in the fashion disclosed in that application approaches the ideal case of a freely rotating body the motion of which is not subject to frictional resistance due to a support or the surrounding medium, or limitations imposed by a drive connection. A rotating magnetic field is disclosed in that application as the means for imparting rotation to the suspended mass. Very high rotational speeds are obtained by the magnetically suspended mass of such an arrangement, and the speed will persist with only negligible loss for many hours. Numerous embodiments utilizing the basic principle of that invention are possible; the embodiments disclosed in said application Serial No. 208,542 include a gyroscope, a strength of materials testing means, an article coating device, and a laboratory test device having an armature of polygonal contour.

In a related application, entitled Magnetically Supported Ultra-Centrifuge, Serial No. 269,097, filed January 30, 1952, by Jesse W. Beams, now Patent No. 2,733,857, there is disclosed an ultra-centrifuge useful for determining molecular weights having a rotor magnetically suspended in an evacuated chamber. This rotor carries a cell into which the substance to be centrifuged is placed. High speed rotary motion is imparted to the rotor by an air turbine drive which is disconnected from the rotor upon attainment of the desired speed, whereupon the chamber is quickly evacuated and the rotor "coasts," thereby approaching the ideal case of a freely rotating body.

Among the advantages of the magnetically supported rotors described in the aforementioned applications are the elimination of bearing friction and chatter. In addition, the suspension in a vacuum chamber greatly reduces the aerodynamic forces which disturb the motion of rotors spinning in air or in gases. Furthermore, other limitations affecting the motion of prior rotors due to the disturbances produced by their drive mechanisms have been substantially removed.

The resistance of the motion of a magnetically supported symmetric steel rotor spinning about a vertical axis, as disclosed in the aforementioned applications, has been found to be due to air friction only. That is, the varying magnetic field supporting the rotor is symmetric and for that reason no eddy currents are produced to retard the rotor. However, with a conducting steel sphere, if the axis of rotation makes a large angle with the axis of the supporting magnetic field eddy currents and magnetic hysteresis introduce appreciable rotor damping and friction. Also, with a conducting ferromagnetic rotor these effects constrain the axis of rotation to coincide with the axis of the magnetic field. By making the conductivity very small and eliminating the magnetic memory, the sphere could be used as a free gyroscope and its axis would remain fixed in space regardless of the changes in orientation of the supporting magnetic field.

In other words, a conducting ferromagnetic sphere which rotates about an axis which is at an angle to the axis of the supporting magnetic field produces torques on the sphere including a torque due to eddy currents, a torque due to magnetic memory, and torque due to the non-homogeneity of the magnetic material of the rotor or its geometrical unbalance. Thus, it will be seen that while a conducting ferromagnetic rotor is suitable for use in the devices described in the aforementioned patent applications, it is not suitable for the rotor of a completely free gyroscope. To eliminate the first two effects, a specially constructed spherical rotor which is non-conducting and which has negligible magnetic memory is required. The elimination of the third torque depends on the attainment of complete homogeneity of the rotor material and exact tolerances in machining the rotor.

A rotor especially constructed to eliminate the eddy current and magnetic memory effects cannot be spun by a rotating magnetic field as disclosed in said application Serial No. 208,542. Furthermore, spinning by air jets is not satisfactory because it is difficult to produce the desired vacuum quickly enough to prevent appreciable deceleration of the rotor.

In its broadest aspect, therefore, this invention has for an object the provision of an improved apparatus for imparting rotation to a mass suspended in a substantially frictionless manner inside a suitable chamber.

An additional object is the provision of means for imparting high rotational speeds to a rotor while the latter is suspended freely in an evacuated chamber by a controllable magnetic field.

A more specific object of the invention resides in the provision of apparatus for spinning magnetically suspended rotors having low conductivity and magnetic memory, so that the rotors can be used in free gyroscopes.

Another object of the invention is to provide apparatus including a rotor, and magnetic means for suspending the rotor, the rotor being constructed so that its axis of rotation is not constrained by the magnetic means.

Other objects and many of the attendant advantages of this invention will be appreciated readily as the same becomes understood by reference to the following detailed description, when considered in connection with the accompanying drawings, wherein.

Briefly, one embodiment of the invention comprises a rotor made of particles of ferromagnetic alloy held together by a non-magnetic binder. This composition is ground carefully so that the rotor has the desired shape. The rotor made in this fashion is inclosed in a vacuum chamber and, as will be described in more detail hereinafter, is adapted to be suspended in a magnetic field to maintain the rotor in a substantially fixed vertical position. A damping arrangement is provided to prevent horizontal movement of the rotor. According to the invention, rotary motion is imparted to a rotor thus suspended by a stream of particles moving at high speed and being directed so that the individual particles impinge on the periphery of the rotor. The particles give up their momentum upon impact, and start the rotor spinning.

In other forms of the invention a rotor assembly comprising a pair of spheres interconnected by a non-conducting, non-magnetic rod is supported magnetically and spun about a horizontal axis by a stream of particles.

Figure 1:
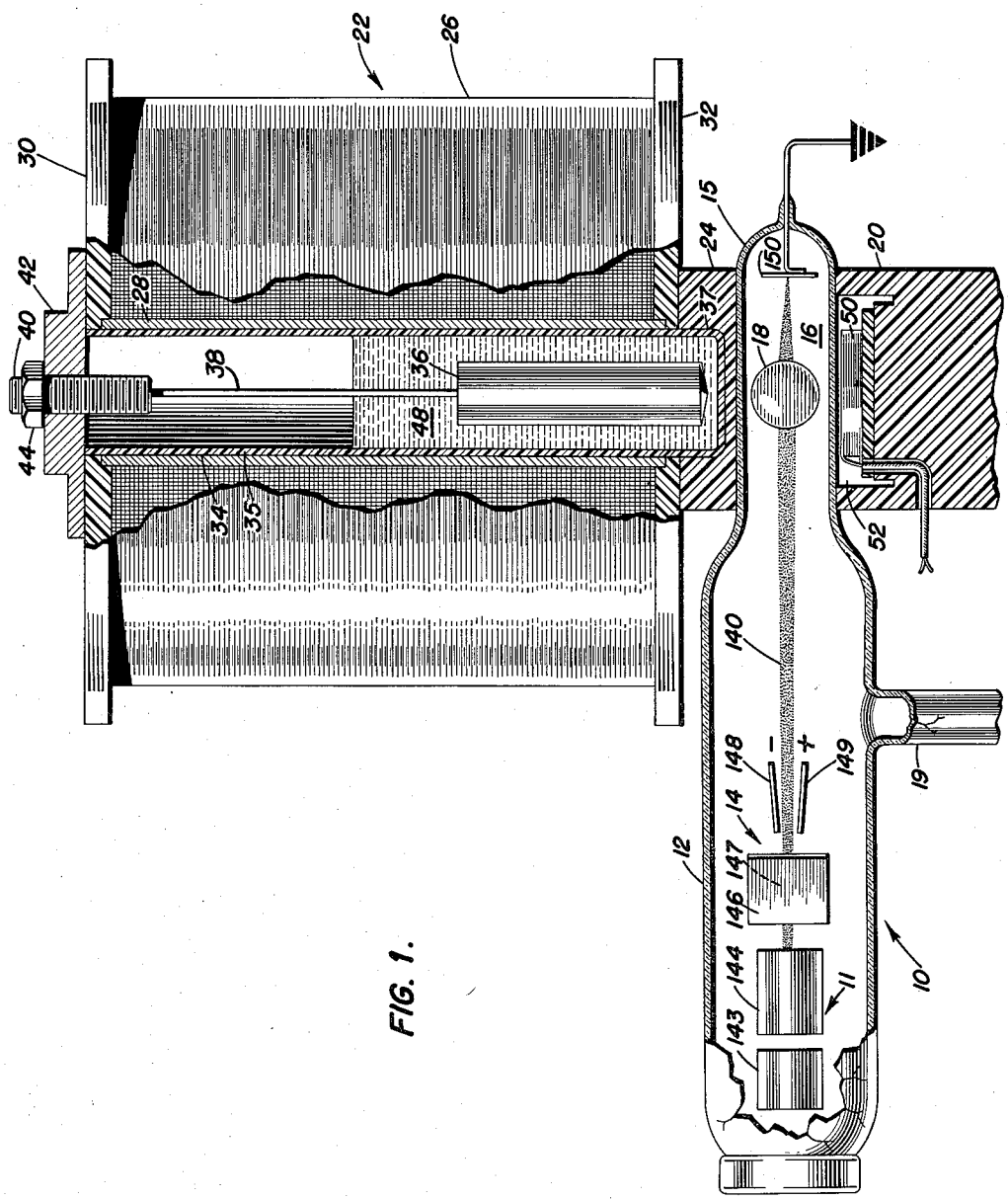
FIG. 1 is a sectional view, partly in elevation, showing one form of the apparatus made in accordance with this invention.

In FIG. 1, an embodiment of the invention is illustrated wherein an electron drive is employed to spin a magnetically suspended rotor, shown as a single sphere. The electron drive is indicated generally by the reference numeral 10. It includes an evacuated and sealed envelope 12 that houses an electron gun and control elements, generally indicated by the reference numerals 11 and 14, respectively, which will be described in detail hereinafter. An extension 15 is formed integrally with the envelope 12 to provide an evacuated chamber 16 in which a rotor 18 is suspended. A pipe 19 is provided on the envelope 12 for connection to a vacuum pump and is adapted to be sealed after evacuation of said envelope 12. A spherical rotor is shown at 18; however, the rotor need not be of this specific shape. It may be made of a pressed composition of magnetic material, as for example, particles of powdered molybdenum permalloy, and a non-conducting, non-magnetic binder that has been carefully worked to the desired shape. A rotor having suitable magnetic memory and conductivity can be made from particles 3 mils in diameter uniformly distributed so that each particle is surrounded by the non-conducting binder.

The extension 15 of envelope 12 is supported on a column 20 which is constructed so as to provide an obstructed view of the rotor 18. An electromagnet which, when energized produces the magnetic field for suspending the rotor 18, is generally indicated by the reference numeral 22. The electromagnet may be supported in any convenient manner and is vertically spaced from the chamber 16 by a block 24. The electromagnet 22 includes a coil 26 wound on a spool 28 having end plates 30 and 32. The spool 28 has an axial aperture 34 to receive a tubular vessel 35 in which a cylindrical soft steel core 36 for the coil 26 is positioned. The tubular vessel 35 extends into a recess 37 formed in the block 24. The core 36 is supported by a fine wire 38 attached to a screw 40 that can be adjusted in a hub 42 by a nut 44. The vessel 35 is made of a non-magnetic, non-conducting material, and contains a light oil or some other suitable damping fluid 48 which surrounds the core 36. This arrangement of the core 36 as a pendulum immersed in oil will damp any motion of the rotor 18 in a plane perpendicular to the axis of the coil. The damping is particularly effective if the natural period of oscillation of the pendulum is equal to that of the lateral oscillation of the suspended rotor. The coupling is then effective to the extent that any oscillation of the rotor is quickly transferred to the core and thence damped out by the oil 48.

Figure 2:
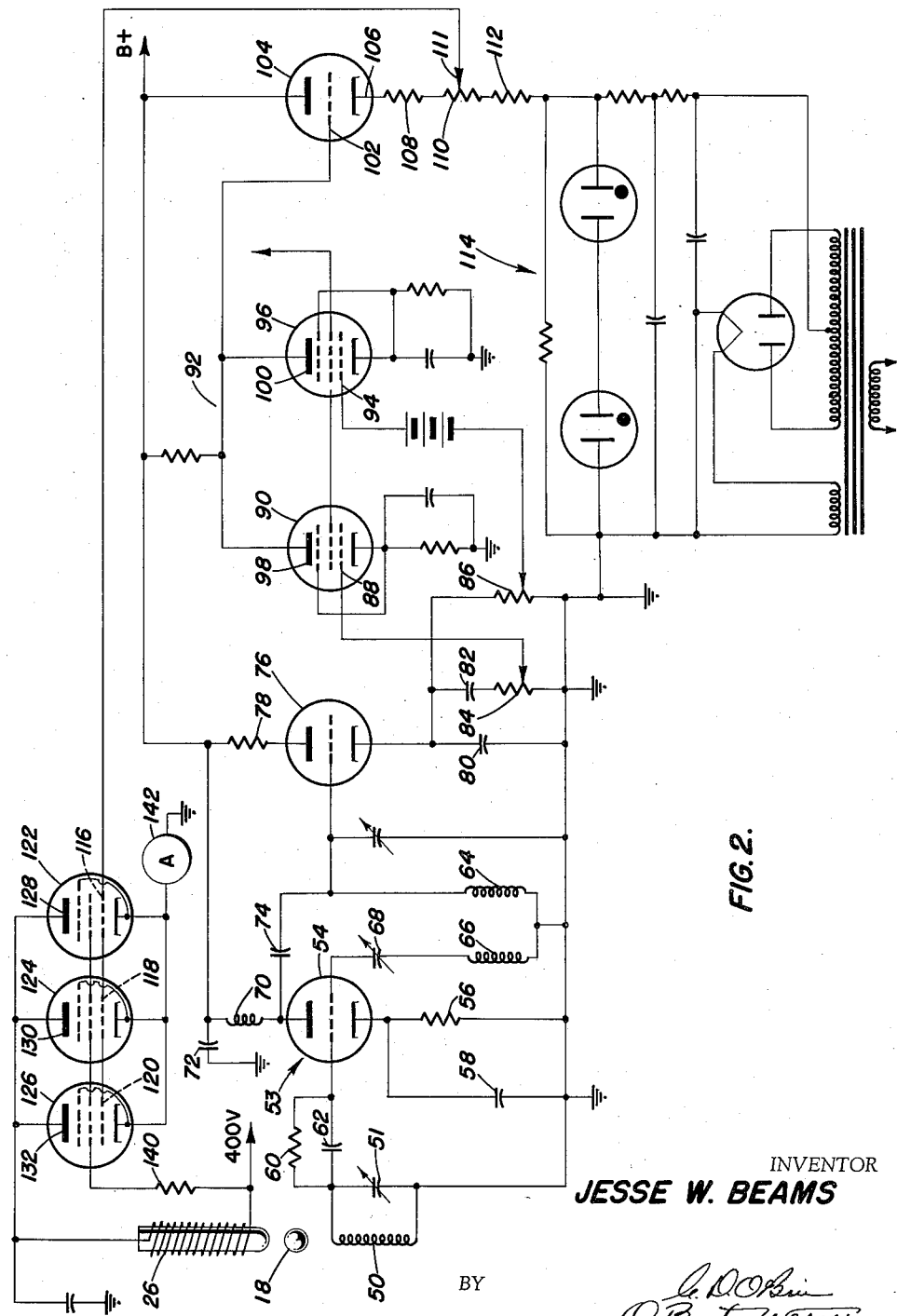
FIG. 2 is a diagram of the circuit used to control a magnetic field to maintain the rotor suspended.

The vertical position of the rotor 18 is regulated by apparatus connected in an electrical circuit, shown in FIG. 2, that detects changes in the rotor's vertical position and increases the current in the coil 26 when the rotor moves downwardly and decreases the current when the rotor moves upwardly. This circuit is substantially identical with one disclosed in aforementioned application Serial No. 208,542, and the description thereof is repeated hereinafter for the sake of convenience. A coil 50 that is positioned just under the rotor 18 in a chamber 52 formed in the column 20 (FIG. 1) is part of this electronic circuit. It can be seen that the coil 50 and a variable capacitor 51 are connected to form the grid tank circuit of a tuned-grid tuned-plate oscillator generally indicated at 53. The oscillator 53 includes a triode vacuum tube 54 having the usual arrangement of a cathode resistor 56 and a by-pass capacitor 58 for biasing the cathode, and a grid-leak resistor 60 and by-pass capacitor 62 connected in the grid circuit. A tank circuit including the inductances 64 and 66 and variable capacitor 68 is connected between the plate and grid of tube 54. A filter circuit, including a radio frequency choke 70 and a capacitor 72, is inserted in the connection between the plate of triode 54 and the source of plate voltage. The impedance of coil 50 will change as the rotor 18 moves up and down and the amplitude of the output from the oscillator will change correspondingly.

The changes in the oscillator's output are utilized by the circuit following the oscillator so that if the rotor rises the current in the coil 26 is decreased, and if it moves downwardly, the current in coil 26 is increased. The oscillations flowing in the plate-grid circuit of triode 54 are coupled through blocking condenser 74 to the grid of a second triode vacuum tube 76 that is connected as a cathode follower. The plate of triode 76 is connected through resistor 78 to the power supply, while its cathode is connected to ground through three branches. These include a first branch having a capacitor 80, a second having a capacitor 82 in series with a variable resistor 84, and a third having a variable resistor 86. The slider of variable resistor 84 is connected to the control grid 88 of a pentode 90. This connection provides a voltage at the grid 88 that is the derivative of the error signal from the oscillator 53 representing a change in the position of rotor 18. The pentode 90 forms one stage of a two stage mixer-amplifier circuit indicated generally by reference numeral 92. The slider of variable resistor 86 is connected to the control grid 94 of a pentode 96 which forms the other stage of the mixer-amplifier circuit 92 so that a voltage proportional to the error signal is applied to the grid 94. The plates 98 and 100 of pentodes 90 and 96 are connected to the grid 102 of a triode vacuum tube 104 so that a mixed signal will appear at the grid 102. Vacuum tube 104 is connected to operate as a cathode follower and has its cathode 106 connected through a voltage divider consisting of resistors 108, 110 and 112 to a regulated power supply 114 of a commercially available type which is employed as a source of bias voltage.

The slider 111 of resistor 110 is connected to the control grids 116, 118 and 120 of a group of power amplifier tubes 122, 124 and 126, respectively, that are connected in parallel to provide current for the coil 26 of the electromagnet 22. The coil 26 has one terminal connected to the anodes 28, 130 and 132 of the power tubes and has its other terminal connected to a high voltage source. The screen grids 134, 136 and 138 of the power tubes are connected to the same voltage source through a resistor 140. A milliammeter 142 is connected in the cathode circuit of the tubes, as shown, to measure the current flowing in the coil 26.

When the circuit described above is adjusted properly, the rotor 18 will be suspended with great stability in the evacuated chamber 16 as shown in FIG. 1, so that a beam of electrons 140 from the electron gun 11, directed to impinge on the periphery of the rotor, will spin said rotor. Referring again to FIG. 1, the electron drive 10 includes an electron gun 11 comprising a source of electrons 143 and an accelerating electrode 144. A group of control electrodes 14 comprising pairs of plates, 146 and 147, and 148 and 149, is provided for focusing and deflecting the electron beam so that it will stroke the periphery of the rotor 18. Although the electron beam may be bent somewhat by the field of the electromagnet 22, it can be deflected by the control electrodes to strike the spherical rotor tangentially.

Upon impact, the electrons give up their momentum to the rotor and the latter starts to spin. The rotor will continue to accelerate as long as electrons in the beam strike its periphery. The rotor will not become charged because secondary electrons will be ejected from the rotor by the high speed electrons in the beam. These secondary electrons and any scattered primary electrons are collected by a grounded electrode 150.

It is believed that the principles of operation of the invention will be clear from the foregoing description. Because of its construction, the rotor is freely supported in the evacuated chamber by the electromagnet 22 and changes in the orientation of the axis of rotation of the rotor with respect to the magnetic field of the coil will not impose any restraint on the motion of the rotor. It can be accelerated to the desired speed by the means of the present invention. As there is no air friction or friction due to a drive connection, the rotor, after attaining the desired speed, will rotate for very long periods of time with no appreciable loss in speeds of rotation. Such a freely suspended rotor is extremely well suited for combination with a pick-off to provide a greatly improved free gyroscope.

Obviously many modifications and variations of the present invention are possible in the light of the above teachings. It is therefore to be understood that within the scope of the appended claims the invention may be practiced otherwise than as specifically described.

What is claimed is:

1. In combination, an evacuated chamber, a rotatable body of magnetically permeable material positioned for free movement in said chamber, means producing a unidirectional magnetic field for freely suspending said body in said chamber and including an electromagnet having an axial aperture above the body, means responsive to a change of position of said body in said chamber for controlling said magnetic field to maintain said body freely suspended in said chamber, means in the chamber for producing a stream of particles impinging on said body for imparting rotation to said body, and means in the aperture for damping any motion of the body perpendicular to the axis of the electromagnet.

2. In combination, structure defining an evacuated chamber, a rotatable body of magnetically permeable material positioned for free movement in said chamber, an electromagnet producing a unidirectionol magnetic field for freely suspending the body in the chamber, said electromagnet having an axial aperture, means responsive to a change of position of said body for regulating said magnetic field to maintain said body freely suspended in said chamber, means in the aperture for damping any motion of the body perpendicular to the axis of the electromagnet, a source of particles in the chamber, and means for forming particles from said source into a beam and directing said beam to strike the periphery of said body for rotating the body within said chamber, said source of particles and said last-mentioned means being constituted by an electron gun including a cathode and a plurality of deflection plates.

3. In combination, a rotor of magnetically permeable material, an evacuated chamber in which the rotor is positioned, an electromagnet adjacent the chamber and above the rotor for providing a unidirectional magnetic field for suspending said rotor in the chamber, means responsive to a change of position of said rotor for controlling said magnetic field to maintain the rotor freely suspended in the chamber, said electromagnet having an axial aperture located above the rotor, a block between the electromagnet and the chamber and having a recess, a tubular vessel in the aperture, a core of magnetic material in the vessel, said vessel extending into said recess, a wire supporting the core in the vessel, a damping fluid in the vessel and surrounding the core, said vessel being formed of non-magnetic, electrically non-conducting material, a source of particles in the chamber, means for directing particles from said source to impinge on the rotor for imparting rotation to said rotor, said core defining a pendulum operable for damping any motion of the rotor in a plane perpendicular to the axis of the electromagnet, and screw means connected with the wire for adjusting the position of the pendulum in the vessel.

References Cited in the file of this patent

UNITED STATES PATENTS

| 588,666 | Stanley | Aug. 24, 1897 |
| 1,192,706 | Thomson | July 25, 1916 |
| 1,589,039 | Anschutz-Kaempfe | June 15, 1926 |
| 1,999,407 | Dumont | Apr. 30, 1935 |
| 2,086,896 | Carter | July 13, 1937 |
| 2,256,937 | Beams et al. | Sept. 23, 1941 |
| 2,377,175 | Peer | May 29, 1945 |
| 2,382,135 | Crew | Aug. 14, 1945 |
| 2,436,939 | Schug | Mar. 2, 1948 |
| 2,557,075 | Caputo | June 19, 1951 |
| 2,566,221 | Lovell | Aug. 28, 1951 |
| 2,691,306 | Beams et al. | Oct. 12, 1954 |
| 2,704,231 | Goldsmith | Mar. 15, 1955 |
| 2,733,857 | Beams | Feb. 7, 1956 |

FOREIGN PATENTS

| 854,730 | Germany | Nov. 6, 1952 |